Nov. 20, 1923. 1,474,566
G. G. SCHORER
APPARATUS FOR SEPARATING FIBROUS AND NONFIBROUS MATERIALS IN FOOD PRODUCTS
Filed Aug. 29, 1921 3 Sheets-Sheet 2
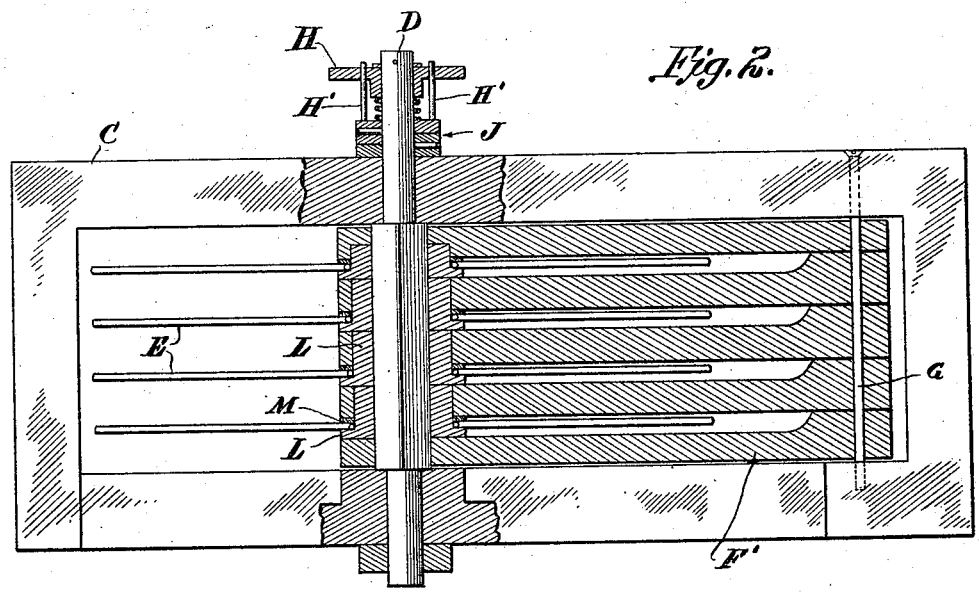
Fig. 2.
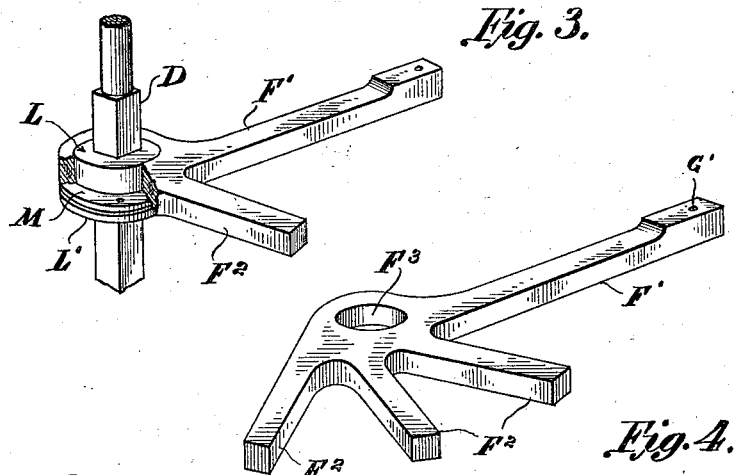
Fig. 3. Fig. 4.
Fig. 5.
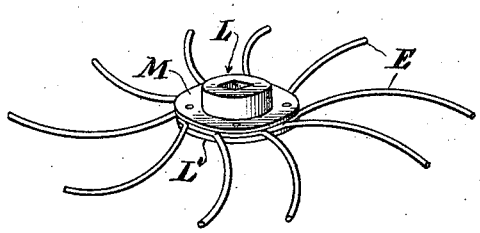
Inventor
George G. Schorer.
By Mason Fenwick & Lawrence.
Attorneys

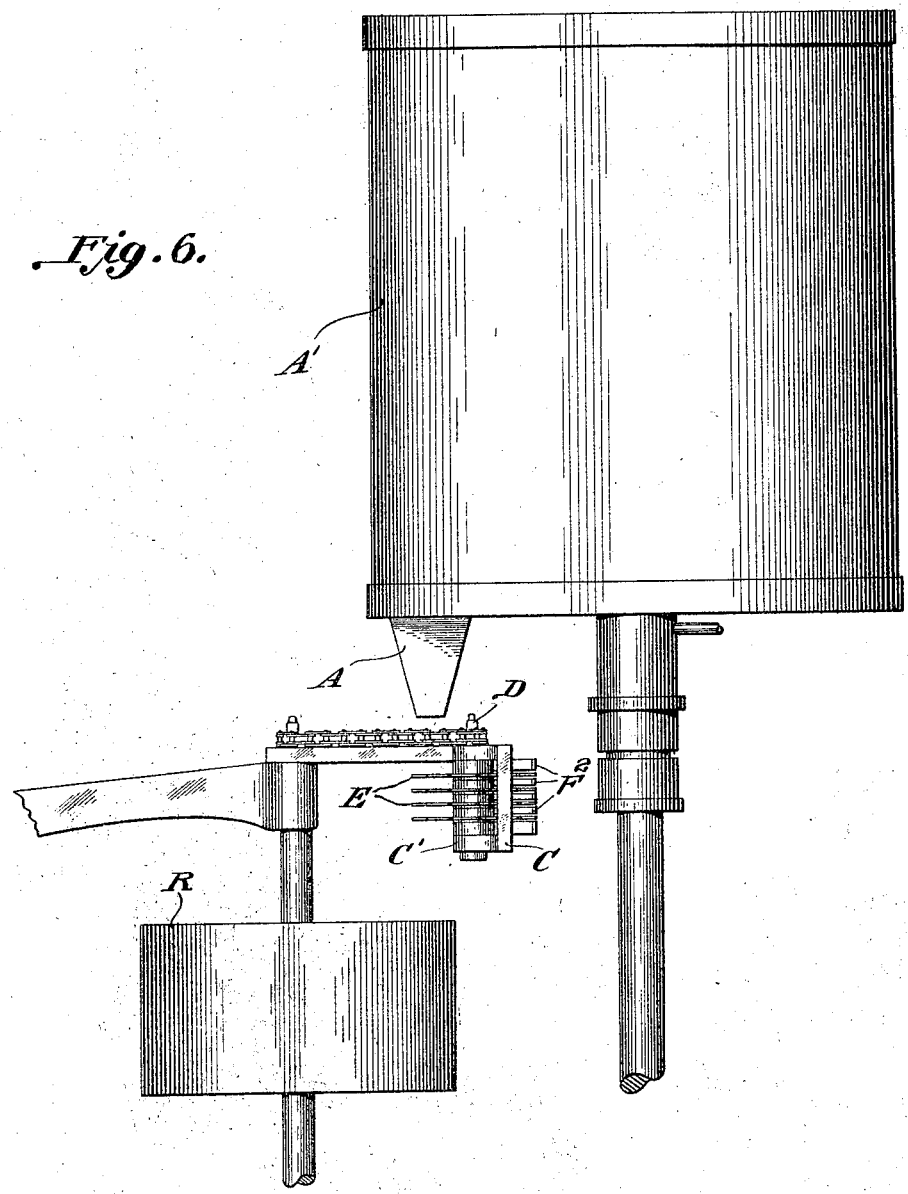

Patented Nov. 20, 1923.

1,474,566

UNITED STATES PATENT OFFICE.

GEORGE G. SCHORER, OF NORTH FREEDOM, WISCONSIN.

APPARATUS FOR SEPARATING FIBROUS AND NONFIBROUS MATERIALS IN FOOD PRODUCTS.

Application filed August 29, 1921. Serial No. 496,761.

*To all whom it may concern:*

Be it known that I, GEORGE G. SCHORER, citizen of the United States, residing at North Freedom, county of Sauk, and State of Wisconsin, have invented certain new and useful Improvements in Apparatus for Separating Fibrous and Nonfibrous Materials in Food Products, of which the following is a specification.

This invention relates to the art of separating fiber-like inedible particles from the edible portions of food grains or the like. It more particularly appertains to separating and removing the silk, husks and fibrous shell particles from a mass of Indian corn or like food grains.

An object of the invention is to separate inedible fibrous particles of the kind described from cooked Indian corn or the like after the cooking process has been completed and during the continuous treatment of the corn to prepare it for packaging ready for consumption.

A further object is to remove the said inedible particles instantaneously from a flowing stream of corn or the like and discharge said inedible particles away from the course of movement of the edible portions.

A further object is to separate the inedible particles from a flowing stream of corn or like grains,—removing said inedible particles laterally from the stream by mechanical separating devices and continuously clearing from the separating devices the materials clinging thereto while said devices are moving outside of the stream of food.

The invention consists in a plurality of slender separating arms with means for moving them transversely through a stream of flowing material in rapid succession. It further consists in the combination of a plurality of arms, means for moving them transversely through and across the stream of flowing material, and means for removing from said arms, outside of the stream of material, the matter caught on said arms. It further consists in the process of separating the fibrous inedible particles from the edible portions of corn or the like and in the combination of parts and details of structure more fully described hereinafter, illustrated in the accompanying drawings and defined in the appended claims.

In the drawings in which like reference characters indicate like parts throughout the several views:

Figure 2 is a sectional view taken on the line 2—2 of Figure 1;

Figure 3 is a detail partly in section of means for clearing the separating arms of materials clinging to them;

Figure 4 is a perspective view of one of the clearing elements;

Figure 5 is a perspective of one set of separating arms and the hub to which they are secured, Fig. 6 is a diagrammatic elevation showing the relative position of a cooker, separating device, and receiver for the cleaned and cooked grains.

Figure 1:
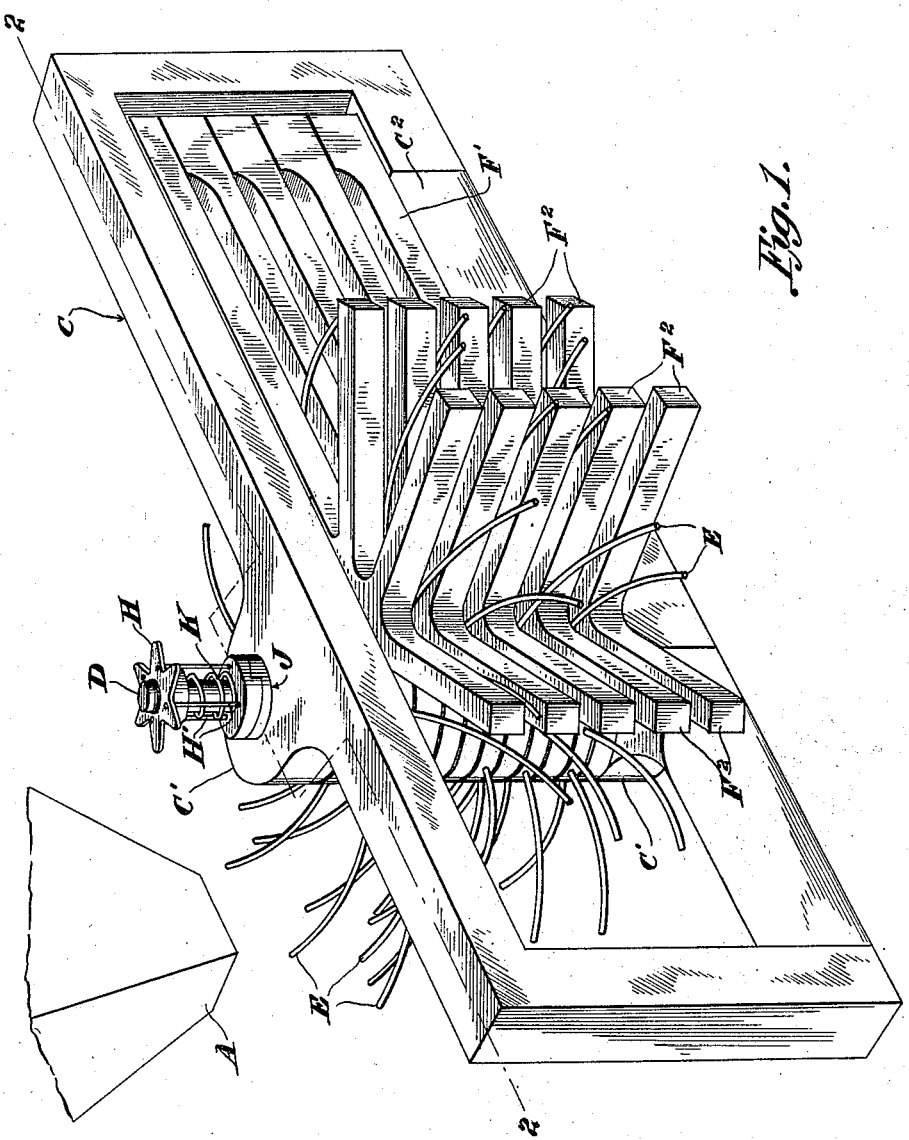
Figure 1 is a perspective view of my improved separating and cleaning mechanism shown in its operative position with respect to a flowing stream of material to be separated.

In the usual process of preparing Indian corn for canning or similar purposes, the grains or kernels of raw corn, after the ears have been husked, are first severed from the cob, as by the knives of any suitable cutting machine. The grains of corn thus severed from the cob usually have clinging to them or mixed with them particles of corn silk or husks which it has been difficult to remove in the husking operation. In order that the corn may be brought to a wholesome and palatable condition it is of course desirable to remove all of the inedible particles of silk, husks and the like from the edible portions. Although machines have been hitherto proposed for this purpose, these machines have not been satisfactory, within my experience, because they have been associated in use with operations collateral to the normal process of treating and preparing the corn as food which has caused increased expense and loss of valuable time as well as deterioration of the resulting food products. For example, it has been proposed to separate the inedible particles from the edible portions of corn prior to the cooking process. The separating operation has sometimes been attempted on raw corn; but this has proven unsatisfactory not only because of the loss of time but also because the inedible particles are not then in the best condition to enable them to be thoroughly separated mechanically from the edible portions. It has also been proposed to apply a preliminary steaming or partial cooking process to the raw corn and then to separate the silk and the like from the steamed or partially cooked product. Each of these processes results in unnecessary consumption of time. Also, when corn or the like is steamed or partially cooked in advance of the usual cooking operations the final product is not so suitable for food as when it is cooked continuously until the proper heat treatment has been completed in one operation. Furthermore, the separating apparatus, with which I am familiar, hitherto used for removing silk and the like from the grains of corn, has either not been kept continually clean, or has been so difficult to clean that particles remain adhering to the separating elements which are likely to ferment, or putrify, thereby effecting deterioration of the food products.

This improved process is applied to a stream of flowing grains of Indian corn or the like moving from the cooker to the packaging or filling apparatus during the usual or normal practice of preparing and packaging the corn. No time is lost, therefore, in the treatment of the grains or similar material, by reason of the cleaning or separting operations. Also, by the use of my process and apparatus for practicing it, the separating elements are kept continually cleaned, each one having all the material that clings to it wiped therefrom after it has moved from the stream of material and before it reenters it. The inedible particles drop away from the separating elements out of the course of the portions designed for food and they cannot find their way back into the stream of edible material moving toward the filling position. By this process the natural flavor and structure of the properly cooked food grain is retained, no preheating or other devitalizing process having been applied to it. The delays and expense due to preheating and precleaning are wholly eliminated and the danger of introducing soured or putrified matter into the edible mass by reason of delayed or inadequate cleaning is avoided.

Referring now to the accompanying drawings, in which one embodiment of means for practicing my improved process is illustrated:

The letter A represents a spout or hopper through which grains of Indian corn or the like are discharged from a cooker A' and fall in a stream into any suitable receptacle or collecting mechanism R used in conjunction with a filling or packaging mechanism (not shown). C is any suitable frame construction adapted to support a mechanism for separating silk or other fibrous material from the grain dropping from the hopper A. The said frame C may be of general oblong, rectangular outline, as indicated in Figure 1, between the ends of which is mounted a shaft D. In the form shown said frame C is provided with two lateral bosses C' in which said shaft D is journaled. Said shaft D may project at one end beyond the upper boss C' and may have loosely mounted on it a gear wheel H, shown as a sprocket wheel, adapted to be driven by a sprocket chain from any suitable drive shaft. J represents a ratchet or one way clutch composed of two ratchet faced members one of which may be fixed to the shaft D and the other of which is sleeved to rotate on said shaft and keyed to the gear wheel whereby said shaft is slidably locked to the gear wheel H in any suitable manner as by rigid rods H' affixed to the clutch member and passing through the gear wheel. A spring K disposed between the slidable member of said clutch and the hub of the gear wheel H permits the slidable section of the clutch to interlock with the fixed section when the gear is rotated in one direction and slip up and down upon the shaft should the gear H be driven in the reverse direction. Any suitable ratchet drive may be adopted, however.

Sleeved over the shaft D is a plurality of flanged hubs L connected with the shaft D so as to rotate therewith. In the construction shown that portion of the shaft D which lies between the upper and lower members of the frame C is squared and the openings through said hubs are correspondingly squared so that the hubs are compelled to rotate with said shaft. Secured to each of the hubs L is a set or plurality of slender separating arms E, each preferably made of wire sufficiently stiff for the purpose. Said slender arms E of each set are preferably spaced equally around the hub L and are preferably curved with their convex sides facing the direction in which they are rotated during the separating operation. Arms E may be secured to each hub by a plate M sleeved over the reduced upper portion of the hub and bolted to the flanged portion L' over the inner ends of the arms. The flange L' of each hub may, if desired, be grooved to receive the inner end of each arm and prevent it from moving angularly with respect to said hub; but the particular manner or means of connecting the arms to the hubs is not of the essence of this invention and any suitable means for making the connection may be adopted. It is intended that the separating arms E shall be secured to successive hubs L so that the arms projecting from one hub will be staggered with respect to the arms of the hub beneath it or over it. Any suitable number of arms may be used and any suitable number of sets of hubs and arms may be sleeved upon the shaft D, it being essential that there shall be enough arms out of registration with each other to adequately search the stream of grain through which said arms are passed in the separating operation.

By the construction illustrated and thus far described a counter clockwise rotation imparted to the gear H, as shown in Figure 1, will cause the slender separating arms E to pass successively transversely through and across the stream of food material flowing from hopper A, the convex sides of said arms advancing through said stream thus searching it thoroughly, entangling the silk and fibrous materials attached to and mixed with the grains and moving them out of said stream.

In order to thoroughly clear from the arms E the fibrous or other materials that have been removed from the stream, and which cling to said arms, without necessitating any cessation of the separating operation, I have provided a series of clearing and cleaning devices that automatically operate upon the arms after they have left the stream of food material and thoroughly clear and clean them before they again enter said stream; and the clearing and cleaning devices are so positioned with respect to the orbit of the arms that the material clinging to the latter is removed from them and caused to drop at points removed from the stream of food where there will be no danger of the separated particles reentering said stream.

I have shown a series of clearing and cleaning devices, suitable for the purpose. Each clearing and cleaning device comprises a bar F' extending parallel with the sides of the frame C and fingers F² radiating from one end of said bar F'. One end of each bar F' is secured to the frame by any suitable means, such as bolt G, which may be passed through the upper member of the frame, through alined holes G' in the bosses F' and into the lower member of the frame and the other end of each bar F' has an opening F³ which is adapted to fit over the reduced portion of the hub L. Although I have shown the fingers F² as substantially straight they may be, if desired, curved in a direction opposite the curvature of the separating arms E. That end of each cleaning device which contains the hole G' is wider, measured parallel with the shaft D, than the bar F' and the fingers F², measured in the same direction, by a distance equal to the thickness of flange L' of the hub L plus the clamping plate M so as to provide space between adjacent cleaning arms and fingers for the passage of the curved separating arms E. In practice it is proposed to secure to said arms rubber or other suitable flexible strips or pads (not shown) between which the fingers E may pass in close contact and which will yield to the pressure of said fingers whereby, as the fingers pass between said cleaning arms, the pads or strips will scrape or rub all material clinging to them off from the arms and cause it to drop into any suitable receptacle or to any place provided for disposal of the waste. The lower member of frame C has its upper surface C² preferably inclined downward and outward to direct material falling on it away from the food stream.

In operation, corn or other like food material is discharged from the cooker through the spout A and dropped in a stream to the filling mechanism (not shown). Previous to the discharge of the corn from the cooker the shaft D will be started revolving in a counter clockwise direction. The closely spaced separating arms E, staggered with respect to each other from top to bottom of the shaft, will pass transversely through and across the flowing stream, thoroughly search it and remove any silk or other fibrous material contained therein; said arms continuing their rotation, having the silk and other waste material clinging to them, pass between the first of the cleaning fingers F² and successively between the remaining fingers F² and finally between bars F', by which they will be thoroughly cleared of all material clinging to them. Owing to the curvature of said separating arms E, their inner ends coming first in contact with the inner ends of the spaces between the cleaning fingers and bars, will be wiped or scraped toward their extremities so that any silk that may have been wound around the arms will be stripped off from their extremities. So also said separating arms will be drawn obliquely and endwise between the final cleaning bars F' and in continued rotation will be again moved, in clean and sanitary condition, into contact with the stream of food material and will again collect therefrom the clinging particles of silk and the like and repeat the operation.

Having described my invention what I claim and desire to secure by Letters Patent is:

1. In mechanism for separating inedible fibrous materials from edible portions of a flowing stream of corn or like material, the combination of a rotatable shaft, a plurality of slender superimposed arms radiating therefrom and adapted to be moved rapidly and successively through and across said stream, and stationary means past which said arms move after having passed through said stream for mechanically removing the material clinging to said arms.

2. In mechanism for separating inedible fibrous particles from edible portions of a flowing stream of corn or like material, the combination of a rotatable shaft, a plurality of sets of slender arms radiating from said shaft the arms of each set being staggered with respect to the arms of adjacent sets and adapted to be moved through said stream.

3. In mechanism for separating inedible fibrous particles from edible portions of a flowing stream of corn or like material, the combination of a frame, a shaft journaled therein, a plurality of superimposed hubs secured to said shaft, a plurality of slender separating arms radiating from each hub, the arms radiating from one hub being in staggered relation to the arms radiating from an adjacent hub.

4. In mechanism for separating inedible fibrous particles from edible portions of a flowing stream of corn or like material, the combination of a frame, a rotatable shaft journaled in said frame, a plurality of superimposed arms radiating from said shaft and adapted to be rotated thereby, and mechanical cleaning devices mounted in said frame, said cleaning devices being so disposed as to engage and clean the arms in that portion of their path of movement which is removed from the separating portion.

5. In mechanism for separating inedible fibrous particles from the edible portions of a flowing stream of corn or like material, the combination of a frame, a rotary shaft mounted therein, a plurality of slender superimposed arms radiating from said shaft, and a plurality of cleaning arms adapted to engage said slender arms obliquely and remove material clinging thereto.

6. In mechanism for separating inedible fibrous particles from the edible portions of a flowing stream of corn or like material, the combination of a frame, a rotary shaft journaled therein, a plurality of series of slender separating arms radiating therefrom, said arms being substantially similarly curved, a plurality of cleaning arms also extending in a general radial direction from the axis of the shaft, between which said separating arms are adapted to be moved, and means for rotating said shaft with the convex sides of the separating arms in advance.

7. In mechanism for separating inedible fibrous particles from the edible portions of a flowing stream of corn or like material, the combination of a frame, a rotary shaft journaled therein, a series of flanged hubs keyed to said shaft, a plurality of slender separating arms secured to each hub, and a plurality of cleaning devices secured at one end in said frame and having their other ends sleeved, respectively, over the reduced portions of said hubs.

8. In mechanism for separating inedible fibrous particles from the edible portions of a flowing stream of corn or like material, the combination of a frame, a rotary shaft journaled therein, a plurality of slender separating arms radiating from the shaft, and a plurality of sets of angularly spaced fixed cleaning fingers extending radially with respect to the shaft at one side of said frame for cleaning said separating arms.

9. In mechanism for separating inedible fibrous particles from the edible portions of a flowing stream of corn or like material, the combination of a frame, a rotary shaft journaled therein, a plurality of flanged hubs secured to said shaft, separating arms radiating from each hub, and a plurality of cleaning devices secured to the frame at one end and having their other ends sleeved over said hubs, respectively, said cleaning devices having clearing fingers radiating therefrom at one side of said frame between which the separating arms are adapted to pass.

10. In mechanism of the class described, the combination of a frame, a revoluble shaft mounted thereon, said shaft carrying radiating separating arms for separating inedible fibrous particles from the edible portions of a flowing stream of corn or like material, cleaning means for engaging and cleaning said arms comprising a member having an opening through which the shaft passes, fingers radiating from the opening, and a bar secured at its end to the frame.

GEORGE G. SCHORER.